Patented Feb. 19, 1952

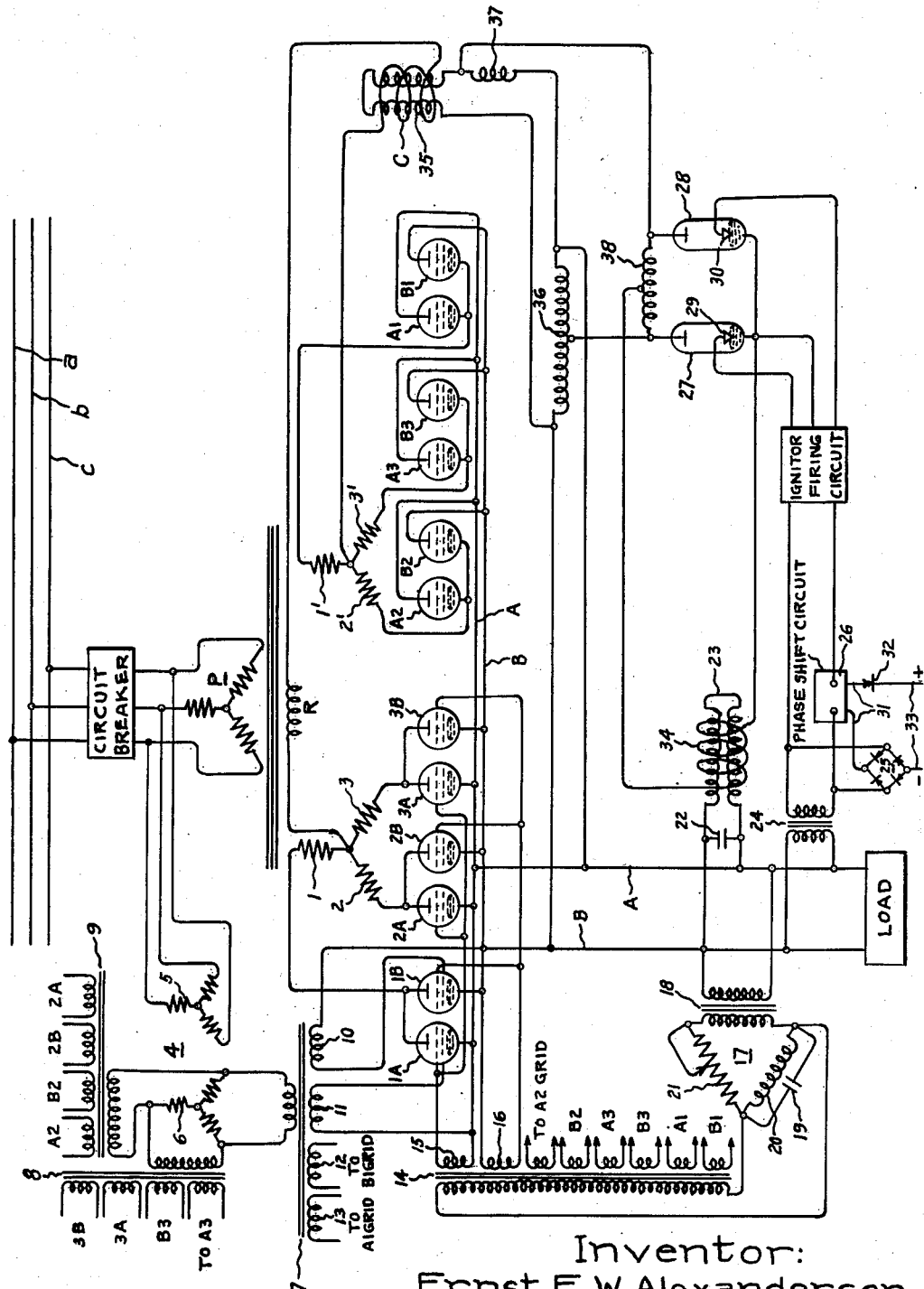

2,586,498

UNITED STATES PATENT OFFICE 2,586,498

ELECTRONIC FREQUENCY CHANGER AND STABILIZING CONTROL MEANS THEREFOR

Ernst F. W. Alexanderson, Schenectady, N. Y., assignor to General Electric Company, a corporation of New York Application February 28, 1951, Serial No. 213,271

8 Claims. (Cl. 321—54)

This invention relates to electronic frequency changers and stabilizing control means therefor and more particularly to an arrangement for delivering controllable frequency power from a substantially constant frequency source. The invention is particularly adapted for use as a speed controlling means for electric motors.

Motor generator sets have been used in the past to supply variable frequency to a load from a constant frequency source and to convert 3 phase power to single phase power. Such machines require large expensive housing facilities and are subject to mechanical failure.

As is well known, it is necessary to supply a control signal to a control grid of an electronic inverter tube at an angle of lead relative to each conducting period of the tube initiated by such control signal. Such angle of lead is sometimes referred to hereinafter as the grid lead angle. It is also well known that in order for an inverter of the electronic type to operate, the current drawn from its plate circuit and supplied to a load must lead the load voltage by an angle corresponding to the grid lead angle. If the power factor of a circuit energized from an electronic inverter is lagging or, if leading by an improper amount relative to the grid lead angle, the system will be unstable or will not function at all. Thus in order to control the frequency supplied to a load circuit from an electronic inverter, some means must be provided for controlling the power factor of the circuit energized from the electronic inverter in such a way that this power factor will always be leading and so that the current drawn from the inverter will lead the load voltage by a proper angle relative to the grid lead angle. Otherwise, the output frequency of the electronic inverter will change in such a way that the inductive reactance and the capacitive reactance of the circuit energized by the inverter will be altered so as to establish a suitable leading power factor for the circuit energized by the inverter or the system will fail to function.

An object of this invention is to provide an improved electronic equipment for converting alternating current power of one frequency to alternating current power at a different frequency which is adjustable to any desired value within limits.

Another object of the invention is to provide a stabilizing arrangement for an electronic frequency changer which effectively maintains a constant output frequency of a desired value irrespective of variations in the magnitude of load applied to the frequency changer.

A further object of the invention is to regulate the power factor of a load applied to an electronic frequency changer in such a way that stable operation of the frequency changer is possible at any desired frequency within limits irrespective of the magnitude of the load applied to the frequency changer.

According to the invention, reactance means energized from an electronic frequency changer is controlled in response to variations in the magnitude of a load energized from the frequency changer so as to maintain the angle of lead of the current drawn from the frequency changer relative to the output voltage thereof at a predetermined value for a given lead angle of the control grids of the frequency changer. In this way a stable output frequency is maintained.

For a better understanding of the invention reference may be had to the accompanying drawing in which the single figure thereof represents schematically an electronic frequency changer embodying the principles of the invention.

With reference to the drawing a schematically represented load is energized by electronic translating apparatus connected to a polyphase system comprising the conductors a, b and c. The load could be a plurality of induction motors connected in parallel so that the speed of such motors could be controlled by controlling the output frequency of the electronic translating apparatus. A transformer having a primary winding P is energized through a circuit breaker from the conductors a, b and c. This transformer is provided with a pair of secondary windings. The first of these windings comprises phases 1, 2 and 3 and the second of these secondary windings comprises phases 1', 2' and 3'. Phase 1 is connected to the plates of tubes 1A and 1B. The cathode of tube 1A is connected to conductor A while the cathode of tube 1B is connected to conductor B. Phase 2 is similarly connected to conductors A and B through tubes 2A and 2B while phase 3 likewise is connected through tubes 3A and 3B to conductors A and B. The phase windings 1', 2' and 3' are interconnected through the tubes indicated with the conductors A and B and unlike the windings 1, 2, and 3, these phase windings 1', 2', and 3' are connected to the cathodes of the associated tubes. As is indicated on the drawing the load circuit is connected across the two conductors A and B and hence is a single phase load as illustrated. The neutrals of the two secondary transformer windings are interconnected through a smoothing reactor R and also through a control winding C, the function of which will be described more fully hereinafter.

For the purpose of supplying a control signal to a grid of each of the tubes comprising the translating apparatus which signal is dependent upon the frequency of the polyphase source comprising conductors a, b and c, a suitable phase adjusting device 4 is provided. Phase adjuster 4 as illustrated is provided with a primary winding 5 and an adjustable secondary winding 6. Output from the three phases of the secondary winding 6 is respectively fed to the primary windings of grid transformers 7, 8 and 9. Transformer 7 is provided with four secondary windings 10, 11, 12 and 13. Secondary winding 11 is arranged to supply a control signal to a grid of tube 1A while secondary winding 10 controls a grid of the tube 1B. In order to simplify the drawing the connections of secondary windings such as 12 and 13 are not actually shown but are indicated on the drawing by descriptive terminology. Thus the secondary winding 12 would be interconnected with a grid of tube B1 while the winding 13 would be arranged to control a grid of tube A1 in a manner identical to the connections for secondary windings 10 and 11. In like manner the four secondary windings of the grid transformers 8 and 9 would be connected to the grids indicated on the drawing although the actual circuits have been omitted for clarity.

For the purpose of supplying a grid signal to each of the electronic tubes which depends upon the frequency of the load circuit, the grid transformer 14 is provided. Transformer 14 is provided with a secondary winding 15 which is arranged to control grids of tubes 1A, 2A and 3A. In similar fashion, the secondary winding 16 of transformer 14 controls a grid of tubes 1B, 2B and 2B. As is indicated on the drawing, 6 other secondary windings are provided for the transformer 14 which would respectively energize a control grid of tubes A2, B2, A3, B3, A1, and B1. The primary winding of transformer 14 is energized from a phase shift circuit generally designated by the numeral 17 which is energized through transformer 18 from conductors A and B. Phase shift circuit 17 comprises a capacitance means 19 and inductive reactance means 20 and a controllable resistance 21. Phase shift circuit 17 could be any known phase shift circuit and is simply for the purpose of shifting the output voltage of the circuit relative to its input voltage so that the phase angle of the grids of the various valves can be adjusted to any desired value within limits.

Assuming that a positive half cycle of voltage exists in phase winding 1, tube 1A would conduct and conductor A would carry current to the load while conductor B would return such current to tube B1 and winding 1'. The load current would then flow between the neutrals of the Y-connected secondary windings by way of the control winding C and the smoothing reactor R.

Since a motor load would be inductively reactive and since a leading current must be drawn from the tubes in order for proper inverter action to take place, it is necessary to provide suitable capacitance means in the output circuit of the electronic inverter. To this end, a capacitor 22 is connected in shunt with the load circuit and a saturable reactor 23 is arranged in parallel therewith. Thus, by varying the degree of saturation of the saturable reactor 23, the effective capacitance of capacitor 22 can be regulated. Thus if the mechanical rotation of the motors is impeded such as by an addition of mechanical load, the current to the load would increase and its voltage would be reduced slightly. In order to maintain a leading current as the output current for the electronic translating apparatus increases, the capacitance of capacitor 22 must then be increased. Thus, according to the invention, means are provided which control the degree of saturation of saturable reactor 23 so as to regulate the effective capacitance of capacitor 22. In this way regardless of changes in the magnitude of the load on the system, the angle of lead of the current drawn from the electronic frequency changer can be maintained at a suitable value relative to the lead angle of the grids of the tubes. Obviously any suitable means for controlling the degree of saturation of saturable reactor 23 could be employed. As illustrated in the drawing, the load voltage is supplied through a transformer 24 to a rectifier 25 and through a phase shift circuit schematically represented at 26 to an ignitor firing circuit which controls in known manner the energization of ionizable medium tubes 27 and 28 by respectively energizing their ignitor elements 29 and 30. The output of the rectifier arrangement 25 is supplied through conductor 31 and a control winding of phase shift device 26 and a rectifier 32 to a suitable bias source indicated at 33. Thus with a fixed bias as indicated at 33, variations in the load voltage will effect variations in the current flowing in a control winding of phase shift device 26. Such variations will control the angle of energization of the ignitors 29 and 30 relative to the respective plate voltages of tubes 27 and 28. In this way the magnitude of current supplied to the control winding 34 of saturable reactor 23 is regulated to some extent.

The arrangement is also responsive to the magnitude of load current since control winding C carries the full load current and hence effectively controls the degree of saturation of saturable reactor 35. A suitable device such as an autotransformer 36 is connected across the conductors A and B and the terminals of this winding are connected through a reactor 37 with the primary winding of saturable reactor 35. The plates of tubes 27 and 28 are interconnected through a reactor 38, the midpoint of which is connected to one terminal of control winding 34 of saturable reactor 23. From the drawing it will be understood that variations in the magnitude of the load current will, by means of the winding C, vary the degree of saturation of saturable reactor 35. In this way the effecting voltage supplied to the terminals of reactor 38 is controlled which in turn effectively controls the magnitude of current through the control winding 34.

From the above description it will be understood that a suitable frequency output could be established by an adjustment of resistor 21 and that this frequency would be maintained provided the current drawn through conductors A and B would be leading with respect to the voltage across those conductors by a proper angle corresponding to the lead angle of the grids as established by the setting of resistor 21. It will be obvious that suitable components for the control of capacitance 22 could be selected and adjusted so that the desired relationship of current in conductors A and B relative to the voltage thereacross would be established. In this way changes in the magnitude of load on the system could not effect changes in the load power factor such as would necessarily cause a change in the load frequency sufficient to change the power factor to some magnitude which would afford a proper leading relationship of the output current of the frequency changer relative to the output voltage thereof. In this way, the frequency output to the load could be maintained at a stable preselected value irrespective of charges in the magnitude of the load.

What I claim as new and desire to secure by Letters Patent of the United States is:

1. In combination, a single phase load, an electronic translating circuit including a plurality of electronic tubes each having a control grid and a plate circuit, the plate circuit of each of said tubes being interconnected between an alternating current circuit and one terminal of said load, means for supplying control signals to said grids at a predetermined grid lead angle so as to render conductive simultaneously an electronic tube connected to each terminal of the load, and means including variable reactance means in parallel with said load and responsive to changes in the magnitude of said load for maintaining the angle of lead of the current drawn from said plate circuits relative to the load voltage at a predetermined magnitude for a given grid lead angle.

2. In combination, a single phase load circuit, a transformer having a pair of polyphase secondary windings, said transformer being energized from a source of polyphase power, an electronic translating circuit including a plurality of electronic tubes each having a control grid and a plate circuit, the plate circuits of each of said tubes being interconnected between one terminal of said load circuit and one phase of one of said secondary windings, adjustable means for supplying control signals to said grids in a sequence corresponding to the phase rotation of said polyphase power, said tubes being connected to supply single phase power to said load circuit, the grid lead angle being determined by the adjustment of said adjustable means, and means including variable reactance means responsive to changes in the magnitude of said load for maintaining the angle of lead of the current drawn from said plate circuits relative to the load voltage at a predetermined value for a given grid lead angle.

3. In combination, a single phase load circuit, a transformer having a pair of polyphase secondary windings, said transformer being energized from a source of polyphase power, an electronic translating circuit including a plurality of electronic tubes each having a control grid and a plate circuit, the plate circuits of each of said tubes being interconnected between one terminal of said load circuit and one phase of one of said secondary windings, adjustable means for supplying control signals to said grids in a sequence corresponding to the phase rotation of said polyphase power, said tubes being connected to supply single phase power to said load circuit, the grid lead angle being determined by the adjustment of said adjustable means, reactance means in parallel with said load circuit, and means responsive to a reduction in the load voltage for increasing the effective capacitance of said reactance means so as to maintain substantially the same angular relationship between the voltage and current supplied by said translating circuit after the reduction in load voltage as existed before such reduction.

4. In combination, a single phase load circuit, a transformer having a pair of polyphase secondary windings, said transformer being energized from a source of polyphase power, an electronic translating circuit including a plurality of electronic tubes each having a control grid and a plate circuit, the plate circuits of each of said tubes being interconnected between one terminal of said load circuit and one phase of one of said secondary windings, adjustable means for supplying control signals to said grids in a sequence corresponding to the phase rotation of said polyphase power, said tubes being connected to supply single phase load to said load circuit, the grid lead angle being determined by the adjustment of said adjustable means, capacitance means in parallel with said load circuit, saturable reactance means in parallel with said capacitance means, and means responsive to variations in a quantity which varies as a function of the magnitude of said load for regulating the reactance of said saturable reactance means so as to maintain a predetermined angular relationship between the voltage and current supplied by said translating circuit.

5. In combination, a single phase inductive load, an electronic translating circuit including a plurality of electronic tubes each having a control grid and a plate circuit, the plate circuit of each of said tubes being interconnected between an alternating current circuit and one terminal of said load, means for supplying leading control signals to said grids so as to render conductive simultaneously an electronic tube connected to each terminal of the load, capacitance means in shunt with said load circuit, and means responsive to changes in the magnitude of said load for controlling the effect of said capacitance means so as to maintain a substantially constant angular displacement between the voltage and current supplied by said translating circuit irrespective of changes in the magnitude of said load.

6. In combination, a single phase load, a source of alternating current energy, an electronic translating circuit energized from said source and including a plurality of electronic tubes each having a control grid and a plate circuit, the plate circuit of each of said tubes being interconnected between an alternating current circuit and one terminal of said load, means for supplying a leading control signal to said grids so as to render conductive simultaneously an electronic tube connected to each terminal of the load, and means including variable reactance means responsive to changes in the magnitude of said load for causing the current drawn from said plate circuits to lead the load voltage by a predetermined angle relative to the lead angle of said control signal.

7. In combination, a single phase load, an electronic translating circuit including a plurality of electronic tubes each having a control grid and a plate circuit, the plate circuit of each of said tubes being interconnected between an alternating current circuit and one terminal of said load, means for supplying leading control signals to said grids so as to render conductive simultaneously an electronic tube connected to each terminal of the load, and means including reactance means responsive to changes in the magnitude of said load for causing the current drawn from said plate circuits to lead the load voltage by a predetermined angle relative to the lead angle of said control signal, and means for adjusting the grid lead angle of the leading signal supplied to said grids.

8. In combination, a single phase load, an electronic translating circuit comprising a plurality of electronic tubes each having a grid circuit and a plate circuit, the plate circuit of each of said tubes being interconnected between an alternating current circuit and one terminal of said load, means for supplying leading control signals to said grids so as to render conductive simultaneously an electronic tube connected to each terminal of the load, capacitance means in parallel with said load circuit, and control means responsive to changes in the magnitude of said load for controlling the effect of said capacitance means in said load circuit so that the angular relationship between the load voltage and the resultant current drawn by said load and said capacitance means is substantially equal to the angle of lead of the grid voltage relative to the plate voltage of said tubes so as to establish a certain output frequency from said translating circuit.

ERNST F. W. ALEXANDERSON.

REFERENCES CITED

The following references are of record in the file of this patent:

UNITED STATES PATENTS

| Number | Name | Date |
| --- | --- | --- |
| 1,904,485 | Livingston | Apr. 18, 1933 |
| 2,278,151 | Runaldue | Mar. 31, 1942 |
| 2,437,837 | Saretzky | Mar. 16, 1948 |